UNITED STATES PATENT OFFICE.

JAMES STUART PALMER, OF LONDON, ENGLAND, ASSIGNOR TO FREDERICK BECK, OF NEW YORK, N. Y.

COMPOSITION OF PLASTIC MATERIAL.

SPECIFICATION forming part of Letters Patent No. 447,412, dated March 3, 1891.

Application filed August 2, 1890. Serial No. 360,818. (No specimens.)

*To all whom it may concern:*

Be it known that I, JAMES STUART PALMER, of No. 1 York Villas, Clova Road, Forest Gate, London, Essex county, England, have made a certain new and useful invention in Compositions of Plastic Material, of which the following is a specification.

My invention relates to compositions for the production of a plastic material, which may be used as a decorative covering for interior walls and ceilings and as a covering for floors as a substitute for the ordinary kinds of oil-cloths, and with slight modifications may be used in the production of tablets, plaques, and objects of art which are usually made from plastic material.

The principal ingredients in my improved composition are the residuum from distilling candle material which is commercially known as "stearine pitch" or "candle pitch" or "stearine bitumen," and sometimes, especially in Europe, as "goudron elastique." The other ingredients are wood-flour, ground fiber or shude or starch refuse, common paraffine-oil, and for some purposes whiting and dry pigments, which last I use for coloring the compound.

The proportions of the several ingredients used in the manufacture of my improved composition should be varied somewhat in order to better adapt the composition to the special uses for which it may be intended, and my invention includes the varying of the proportions of the mentioned ingredients within certain limits, as may be required by the greater hardness or softness of the residuum without departing from the invention, if such variation may at any time from any peculiarity of requirement be desirable, four examples of which are as follows:

First. If the composition is intended to be used for the decoration of walls or ceilings or as a covering for floors as a substitute for oil-cloth, it may be made from the medium-soft bitumen, and the ingredients should be compounded in the following proportions, viz: stearine bitumen, one hundred and twelve parts; wood-flour, seventy parts; ground fiber or shude or starch refuse, fifty-six parts; common paraffine-oil, one and one-half part; dry pigments, fifty-six parts.

Second. If the composition is intended to be used for wall-hangings and is to be made from toughish dark bitumen, the ingredients should be compounded in the following proportions: stearine bitumen, one hundred and twelve parts; wood-flour, fifty-six parts; ground fiber or shude or starch refuse, fifty-six parts; common paraffine-oil, one and one-fourth part; dry pigments, fifty-six parts.

Third. If the composition is intended for wall-hangings which are desired to be in imitation of soft leather, the ingredients should be compounded in the following proportions, viz: stearine bitumen, one hundred and twelve parts; wood-flour, fifty-six parts; ground fiber or shude or starch refuse, seventy parts; common paraffine-oil, one-half part; dry pigment, fifty-six parts.

Fourth. If the composition is intended to be used for plaques, tablets, or molded objects of art, whether either molded in statuette form or in very high relief, the ingredients should be compounded in the following proportions, viz: stearine bitumen, one hundred and twelve parts; wood-flour, eighty-four parts; ground fiber or shude or starch refuse, twenty-one parts; whiting, twenty-one parts; common paraffine-oil, two parts; dry pigments, twenty-one parts.

In carrying my invention into practice the specified ingredients should be thoroughly amalgamated in a kneading or mixing machine suitable for the thorough mixing and amalgamation of the materials with which this invention deals, and the ingredients should be worked in a mixer at the temperature of about 150° Fahrenheit. The thorough mixing is facilitated if the bitumen is heated in the mixer before the other ingredients are introduced, and the wood-flour and ground fiber should preferably be added gently and in a dry state. When the ingredients have been thoroughly compounded and amalgamated by the mixing process and the composition has attained a thorough binding plastic consistency it is spread according to any convenient method upon a backing-paper, canvas, or other suitable material, and introduced between embossing rollers or plates. The backing may be either continuous or in sheets of any desired size, according as the decoration to be manufactured is wanted in long lengths, such as hangings for walls or coverings for floors, or in sheets of definite size, such as ornamental tablets, or other similar limited areas. The thickness to which the composition is spread upon the backing is regulated according to the particular purposes of the article to be manufactured. The surfaces of the spreading-machine with which the composition comes in contact should preferably be kept warm.

My invention does not limit me to any special mechanical device for embossing the design upon the composition spread as described; but I may use any suitable arrangement of embossing or engraving rollers or flat surfaces or plates adapted to exert the proper degree of pressure upon the composition from either one or both sides, and to produce the design in either solid or hollow relief I may use any particular type of surfacing or embossing machine, inasmuch as I may use any of the well-known types adapted to spread and emboss a hot plastic composition upon a backing in either web or sheet form. It will be found advantageous to lubricate slightly with common paraffine-oil the embossing surfaces.

In the manufacture of solid articles—such, for instance, as statuettes—the spreading and backing is dispensed with, and the composition, when brought to the state above described as suitable for spreading upon a backing, may be transferred to the molds in any suitable well-known manner, it being proper, however, to slightly lubricate the interior surfaces of this mold with common paraffine-oil, as above mentioned in the case of the embossing-plates.

The finished webs or sheets or molded articles will season and become hard if left to themselves, or this part of the process may be expedited by exposing them to a temperature of 120° Fahrenheit for a few hours.

What I claim as new, and desire to secure by Letters Patent, is—

1. In a composition adapted for the production of decorative surfaces for walls, ceilings, floors, and other surfaces requiring decoration, stearine bitumen and a vegetable or an equivalent substance capable of being incorporated with it to give increased body to the composition.

2. A composition suitable for the manufacture of embossed or molded articles, consisting of stearine bitumen, wood-flour, and ground fiber, with or without whiting and with or without a pigment or coloring substance.

In witness whereof I have hereunto set my hand.

JAMES STUART PALMER.

Witnesses:
LAURENCE O. MURRAY,
HENRY STANFORD BROOKS.